(12) United States Patent
Zhu

(10) Patent No.: US 11,733,492 B2
(45) Date of Patent: Aug. 22, 2023

(54) CAMERA OPTICAL LENS INCLUDING SEVEN LENSES OF +++--+- REFRACTIVE POWERS

(71) Applicant: AAC Optics (Suzhou) Co., Ltd., Suzhou (CN)

(72) Inventor: Junyan Zhu, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 453 days.

(21) Appl. No.: 17/131,785

(22) Filed: Dec. 23, 2020

(65) Prior Publication Data

US 2022/0066152 A1 Mar. 3, 2022

(30) Foreign Application Priority Data

Sep. 2, 2020 (CN) .......................... 202010912077.1

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2020/0249434 A1* 8/2020 Lin ........................ G02B 13/18

* cited by examiner

*Primary Examiner* — Wen Huang
(74) *Attorney, Agent, or Firm* — W&G Law Group

(57) ABSTRACT

A camera optical lens is provided, including from an object side to an image side: a first lens having positive refractive power; a second lens having positive refractive power; a third lens having positive refractive power; a fourth lens having negative refractive power; a fifth lens having negative refractive power; a sixth lens having positive refractive power; and a seventh lens having negative refractive power. The camera optical lens satisfies following conditions: $1.50 \leq f2/f \leq 5\ 0.00$; $-9.50 \leq (R9+R10)/(R9-R10) \leq -1.20$; $-2.00 \leq f7/f \leq -0.60$, where f denotes focal length of the camera optical lens; f2 denotes focal length of the second lens; f7 denotes focal length of the seventh lens; R9 denotes central curvature radius of object side surface of the fifth lens; and R10 denotes central curvature radius of image side surface of the fifth lens. The above camera optical lens may meet design requirements for large aperture, wide angle and ultra-thinness, while maintaining good imaging quality.

9 Claims, 12 Drawing Sheets

CAMERA OPTICAL LENS INCLUDING SEVEN LENSES OF +++−−+− REFRACTIVE POWERS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the emergence of smart phones in recent years, the demand for a miniature camera lens is continuously increasing, but in general, photosensitive devices of a camera lens are nothing more than a Charge Coupled Device (CCD) or a Complementary Metal-Oxide Semiconductor Sensor (CMOS sensor), and as progress of semiconductor manufacturing technology makes a pixel size of the photosensitive devices become smaller, in addition, a current development trend of electronic products requires better performance with thinner and smaller dimensions, miniature camera lenses with good imaging quality therefore have become a mainstream in the market.

In order to obtain better imaging quality, a camera lens traditionally equipped in a camera of a mobile phone generally constitutes three or four lenses. Moreover, with development of technology and increase in diversified requirements of users, a camera lens constituted by five, six or seven lenses gradually appears in camera design, in case that a pixel area of the photosensitive device is continuously reduced and requirements on imaging quality is continuously increased. Although the common camera lens constituted by seven lenses has good optical performances, its configuration such as refractive power, lens spacing and lens shape still need to be optimized, therefore the camera lens may not meet design requirements for some optical performances such as large aperture, ultra-thinness and wide angle while maintaining good imaging quality.

SUMMARY

In view of the above problems, the present invention provides a camera optical lens, which may meet design requirements for some optical performances such as large aperture, wide angle and ultra-thinness while maintaining good imaging quality.

Embodiments of the present invention provide a camera optical lens, including from an object side to an image side:
a first lens having positive refractive power;
a second lens having positive refractive power;
a third lens having positive refractive power;
a fourth lens having negative refractive power;
a fifth lens having negative refractive power;
a sixth lens having positive refractive power; and
a seventh lens having negative refractive power;
wherein the camera optical lens satisfies following conditions:

$$1.50 \leq f2/f \leq 5.00;$$

$$-9.50 \leq (R9+R10)/(R9-R10) \leq -1.20; \text{ and}$$

$$-2.00 \leq f7/f \leq -0.60,$$

where
f denotes a focal length of the camera optical lens;
f2 denotes a focal length of the second lens;
f7 denotes a focal length of the seventh lens;
R9 denotes a central curvature radius of an object side surface of the fifth lens; and
R10 denotes a central curvature radius of an image side surface of the fifth lens.

As an improvement, the camera optical lens satisfies a following condition:

$$1.20 \leq d5/d7 \leq 2.00,$$

where
d5 denotes an on-axis thickness of the third lens; and
d7 denotes an on-axis thickness of the fourth lens.

As an improvement, the camera optical lens satisfies following conditions:

$$2.10 \leq f1/f \leq 42.61;$$

$$3.31 \leq (R1+R2)/(R1-R2) \leq 199.94; \text{ and}$$

$$0.02 \leq d1/TTL \leq 0.09,$$

where
f1 denotes a focal length of the first lens;
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

As an improvement, the camera optical lens satisfies following conditions:

$$-24.36 \leq (R3+R4)/(R3-R4) \leq -1.89; \text{ and}$$

$$0.03 \leq d3/TTL \leq 0.13,$$

where
R3 denotes a central curvature radius of an object side surface of the second lens;
R4 denotes a central curvature radius of an image side surface of the second lens;
d3 denotes an on-axis thickness of the second lens; and
TTL denotes a total optical length from an object side surface of the first lens to an image plane of the camera optical lens along an optic axis.

As an improvement, the camera optical lens satisfies following conditions:

$$0.74 \leq f3/f \leq 3.11;$$

$$0.23 \leq (R5+R6)/(R5-R6) \leq 1.81; \text{ and}$$

$$0.05 \leq d5/TTL \leq 0.21,$$

where
f3 denotes a focal length of the third lens;
R5 denotes a central curvature radius of an object side surface of the third lens;
R6 denotes a central curvature radius of an image side surface of the third lens;
d5 denotes an on-axis thickness of the third lens; and
TTL denotes a total optical length from an object side surface of the first lens to an image plane of the camera optical lens along an optic axis.

As an improvement, the camera optical lens satisfies following conditions:

$$-4.76 \leq f4/f \leq -0.70;$$

$$-4.86 \leq (R7+R8)/(R7-R8) \leq -0.59; \text{ and}$$

$$0.03 \leq d7/TTL \leq 0.12,$$

where f4 denotes a focal length of the fourth lens;
R7 denotes a central curvature radius of an object side surface of the fourth lens;
R8 denotes a central curvature radius of an image side surface of the fourth lens;
d7 denotes an on-axis thickness of the fourth lens; and
TTL denotes a total optical length from an object side surface of the first lens to an image plane of the camera optical lens along an optic axis.

As an improvement, the camera optical lens satisfies following conditions:

$$-49.24 \leq f5/f \leq -1.10; \text{ and}$$

$$0.04 \leq d9/TTL \leq 0.17,$$

where f5 denotes a focal length of the fifth lens;
d9 denotes an on-axis thickness of the fifth lens; and
TTL denotes a total optical length from an object side surface of the first lens to an image plane of the camera optical lens along an optic axis.

As an improvement, the camera optical lens satisfies following conditions:

$$0.27 \leq f6/f \leq 1.55;$$

$$-1.97 \leq (R11+R12)/(R11-R12) \leq -0.04; \text{ and}$$

$$0.05 \leq d11/TTL \leq 0.19,$$

where f6 denotes a focal length of the sixth lens;
R11 denotes a central curvature radius of an object side surface of the sixth lens;
R12 denotes a central curvature radius of an image side surface of the sixth lens;
d11 denotes an on-axis thickness of the sixth lens; and
TTL denotes a total optical length from an object side surface of the first lens to an image plane of the camera optical lens along an optic axis.

As an improvement, the camera optical lens satisfies following conditions:

$$0.73 \leq (R13+R14)/(R13-R14) \leq 7.39; \text{ and}$$

$$0.04 \leq d13/TTL \leq 0.12,$$

where

R13 denotes a central curvature radius of an object side surface of the seventh lens;
R14 denotes a central curvature radius of an image side surface of the seventh lens;
d13 denotes an on-axis thickness of the seventh lens; and
TTL denotes a total optical length from an object side surface of the first lens to an image plane of the camera optical lens along an optic axis.

As an improvement, the camera optical lens satisfies a following condition:

$$TTL/IH \leq 1.45,$$

where

IH denotes an image height of the camera optical lens; and
TTL denotes a total optical length from an object side surface of the first lens to an image plane of the camera optical lens along an optic axis.

The present invention has following beneficial effects: the camera optical lens according to the present invention not only has excellent optical performances, but also has large aperture, wide angle, and ultra-thinness properties, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
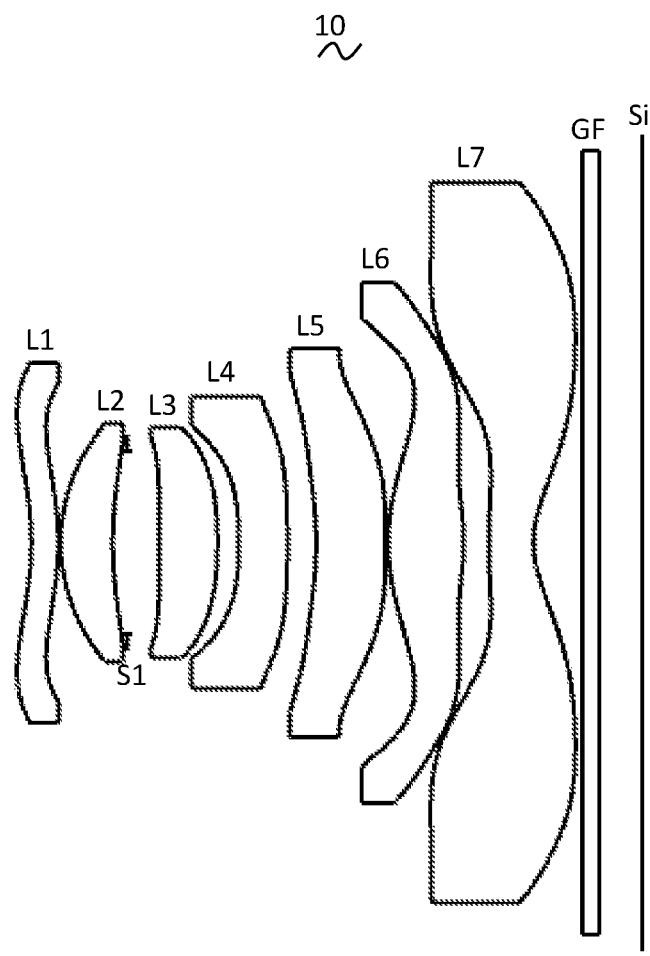
FIG. 1 is a structural schematic diagram of a camera optical lens according to Embodiment 1 of the present invention.

Referring to FIG. 1, the present invention provides a camera optical lens 10. FIG. 1 shows a camera optical lens 10 according to Embodiment 1 of the present invention. The camera optical lens 10 includes seven lenses. The camera optical lens 10 includes, from an object side to an image side: a first lens L1, a second lens L2, an aperture S1, a third lens L3, a fourth lens L4, a fifth lens L5, a sixth lens L6 and a seventh lens L7. An optical element such as an optical filter GF may be arranged between the seventh lens L7 and an image plane S1.

In this embodiment, the first lens L1 has positive refractive power, the second lens L2 has positive refractive power, the third lens L3 has positive refractive power, the fourth lens L4 has negative refractive power, the fifth lens L5 has negative refractive power, the sixth lens L6 has positive refractive power and the seventh lens L7 has negative refractive power.

In this embodiment, the first lens L1, the second lens L2, the third lens L3, the fourth lens L4, the fifth lens L5, the sixth lens L6 and the seventh lens L7 are each made of a plastic material. In other embodiments, the lenses may also be made of a material other than the plastic material.

In this embodiment, a focal length of the camera optical lens 10 is defined as f, and a focal length of the second lens L2 is defined as f2. The focal length f and the focal length f2 satisfy a following condition: $1.50 \leq f2/f \leq 5.00$, which specifies a ratio of the focal length to the focal length of the second lens to the focal length of the camera optical lens 10. Within the range of the above condition, it is beneficial to correct aberrations and improve imaging quality.

A central curvature radius of an object side surface of the fifth lens L5 is defined as R9, and a central curvature radius of an image side surface of the fifth lens L5 is defined as R10. The central curvature radius R9 and the central curvature radius R10 satisfy a following condition: $-9.50 \leq (R9+R10)/(R9-R10) \leq -1.20$, which specifies a shape of the fifth lens. Within the above range of the condition, a degree of deflection of light passing through the lens may be alleviated, and aberrations may be effectively reduced.

The focal length of the camera optical lens 10 is defined as f, and a focal length of the seventh lens L7 is defined as P. The focal length f and the focal length P satisfy a following condition: $-2.00 \leq f7/f \leq -0.60$, which specifies a ratio of the focal length of the seventh lens to the focal length of the camera optical lens 10. Within the above range of the condition, it is beneficial to correct field curvature and improve imaging quality.

An on-axis thickness of the third lens L3 is defined as d5, and an on-axis thickness of the fourth lens L4 is defined as d7. The on-axis thickness d5 and the on-axis thickness d7 satisfy a following condition: $1.20 \leq d5/d7 \leq 2.00$. With appropriate configuration of a ratio of the on-axis thickness to the on-axis thickness, it is beneficial to processing and assembling the lenses.

In this embodiment, the object side surface of the first lens L1 is concave in a paraxial region, and the image side surface of the first lens L1 is convex in the paraxial region.

A focal length of the camera optical lens 10 is defined as f, and a focal length of the first lens L1 is defined as f1. The focal length f and the focal length f1 satisfy a following condition: $2.10 \leq f1/f \leq 42.61$, which specifies a ratio of the focal length of the first lens L1 to the focal length of the camera optical lens. Within the range of the above condition, the first lens has appropriate positive refractive power, so that it is beneficial to reduce aberrations of the system while it is beneficial to development of ultra-thinness and wide-angle of the camera optical lens. Optionally, the focal length f and the focal length f1 satisfy a following condition: $3.35 \leq f1/f \leq 34.09$.

A central curvature radius of an object side surface of the first lens L1 is defined as R1, and a central curvature radius of an image side surface of the first lens L1 is defined as R2. The central curvature radius R1 and the central curvature radius R2 satisfy a following condition: $3.31 \leq (R1+R2)/(R1-R2) \leq 199.94$. A shape of the first lens L1 is reasonably controlled, so that the first lens L1 may effectively correct spherical aberration of the system. Optionally, the central curvature radius R1 and the central curvature radius R2 satisfy a following condition: $5.30 \leq (R1+R2)/(R1-R2) \leq 159.96$.

An on-axis thickness of the first lens L1 is defined as d1, and a total optical length from the object side surface of the first lens to an image plane of the camera optical lens 10 along an optic axis is defined as TTL. The on-axis thickness d1 and the total optical length TTL satisfy a following condition: $0.02 \leq d1/TTL \leq 0.09$. Within the range of the above condition, it is beneficial to achieve an ultra-thinness effect. Optionally, the on-axis thickness d1 and the total optical length TTL satisfy a following condition: $0.04 \leq d1/TTL \leq 0.07$.

In this embodiment, the object side surface of the second lens L2 is convex in a paraxial region, and the image side surface of the second lens L2 is concave in the paraxial region.

A central curvature radius of an object side surface of the second lens L2 is defined as R3, and a central curvature radius of an image side surface of the second lens L2 is defined as R4. The central curvature radius R3 and the central curvature radius R4 satisfy a following condition: $-24.36 \leq (R3+R4)/(R3-R4) \leq -1.89$, which specifies a shape of the second lens L2. Within the range of the above condition, as the camera optical lens becomes ultra-thinness and wide-angle, it is beneficial to correct on-axis chromatic aberration. Optionally, the central curvature radius R3 and the central curvature radius R4 satisfy a following condition: $-15.22 \leq (R3+R4)/(R3-R4) \leq -2.36$.

An on-axis thickness of the second lens L2 is defined as d3, and a total optical length from the object side surface of the first lens to an image plane of the camera optical lens 10 along an optic axis is defined as TTL. The on-axis thickness d3 and the total optical length TTL satisfy a following condition: $0.03 \leq d3/TTL \leq 0.13$. Within the range of the above condition, it is beneficial to achieve an ultra-thinness effect. Optionally, the on-axis thickness d3 and the total optical length TTL satisfy a following condition: $0.05 \leq d3/TTL \leq 0.10$.

In this embodiment, the object side surface of the third lens L3 is concave in a paraxial region, and the image side surface of the third lens L3 is convex in the paraxial region.

A focal length of the third lens L3 is defined as f3, and the focal length of the camera optical lens 10 is defined as f. The focal length f and the focal length f3 satisfy a following condition: $0.74 \leq f3/f \leq 3.11$. With appropriate configuration of the refractive power, the system may obtain better imaging quality and lower sensitivity. Optionally, the focal length f and the focal length f3 satisfy a following condition: $1.18 \leq f3/f \leq 2.49$.

A central curvature radius of an object side surface of the third lens L3 is defined as R5, and a central curvature radius of an image side surface of the third lens L3 is R6. The central curvature radius R5 and the central curvature radius R6 satisfy a following condition: $0.23 \leq (R5+R6)/(R5-R6)$ ≤1.81, which specifies a shape of the third lens. Within the above range of the condition, a degree of deflection of light passing through the lens may be alleviated, and aberrations may be effectively reduced. Optionally, the central curvature radius R5 and the central curvature radius R6 satisfy a following condition: $0.38 \leq (R5+R6)/(R5-R6) \leq 1.45$.

An on-axis thickness of the third lens L3 is d5, and a total optical length from the object side surface of the first lens to an image plane of the camera optical lens 10 along an optic axis is defined as TTL. The on-axis thickness d5 and the total optical length TTL satisfy a following condition: $0.05 \leq d5/TTL \leq 0.21$. Within the range of the above condition, it is beneficial to achieve an ultra-thinness effect. Optionally, the on-axis thickness d5 and the total optical length TTL satisfy a following condition: $0.08 \leq d5/TTL \leq 0.17$.

In this embodiment, the object side surface of the fourth lens L4 is concave in a paraxial region, and the image side surface of the fourth lens L4 is convex in the paraxial region.

The focal length of the fourth lens L4 is defined as f4, the focal length of the camera optical lens 10 is f. The focal length f and the focal length f4 satisfy a following condition: $-4.76 \leq f4/f \leq -0.70$, which specifies a ratio of the focal length of the fourth lens to the focal length of the camera optical lens. Within the range of the above condition, it is beneficial to improve performance of the optical system. Optionally, the focal length f and the focal length f4 satisfy a following condition: $-2.98 \leq f4/f \leq -0.87$.

A central curvature radius of an object side surface of the fourth lens L4 is defined as R7, and a central curvature radius of an image side surface of the fourth lens L4 is defined as R8. The central curvature radius R7 and the central curvature radius R8 satisfy a following condition: $-4.86 \leq (R7+R8)/(R7-R8) \leq -0.59$, which specifies a shape of the fourth lens L4. Within the range of the above condition, it is beneficial to correct the aberration of off-axis angle with the development of ultra-thinness and wide-angle. Optionally, the central curvature radius R7 and the central curvature radius R8 satisfy a following condition: $-3.04 \leq (R7+R8)/(R7-R8) \leq -0.74$.

An on-axis thickness of the fourth lens L4 is defined as d7, and a total optical length from the object side surface of the first lens to an image plane of the camera optical lens 10 along an optic axis is defined as TTL. The on-axis thickness d7 and the total optical length TTL satisfy a following condition: $0.03 \leq d7/TTL \leq 0.12$. Within the range of the above condition, it is beneficial to achieve an ultra-thinness effect. Optionally, the on-axis thickness d7 and the total optical length TTL satisfy a following condition: $0.05 \leq d7/TTL \leq 0.10$.

In this embodiment, the object side surface of the fifth lens L5 is concave in a paraxial region, and the image side surface of the fifth lens L5 is convex in the paraxial region.

The focal length of the camera optical lens 10 is defined as f, and a focal length of the fifth lens L5 is defined as f5. The focal length f and the focal length f5 satisfy a following condition: $-49.24 \leq f5/f \leq -1.10$. The limitation on the fifth lens L5 may effectively make the camera lens have a gentle light angle, thereby reducing tolerance sensitivity. Optionally, the focal length f and the focal length f5 satisfy a following condition: $-30.78 \leq f5/f \leq -1.38$.

An on-axis thickness of the fifth lens L5 is defined as d9, and a total optical length from the object side surface of the first lens to an image plane of the camera optical lens 10 along an optic axis is defined as TTL. The on-axis thickness d9 and the total optical length TTL satisfy a following condition: $0.04 \leq d9/TTL \leq 0.17$. Within the range of the above condition, it is beneficial to achieve an ultra-thinness effect. Optionally, the on-axis thickness d9 and the total optical length TTL satisfy a following condition: $0.07 \leq d9/TTL \leq 0.14$.

In this embodiment, the object side surface of the sixth lens L6 is convex in a paraxial region, and the image side surface of the sixth lens L6 is convex in the paraxial region.

The focal length of the camera optical lens 10 is defined as f, and a focal length of the sixth lens L6 is defined as f6. The focal length f and the focal length f6 satisfy a following condition: a following condition: $0.27 \leq f6/f \leq 1.55$. With appropriate configuration of the refractive power, the system may obtain better imaging quality and lower sensitivity. Optionally, the focal length f and the focal length f6 satisfy a following condition: $0.43 \leq f6/f \leq 1.24$.

A curvature radius of an object side surface of the sixth lens L6 is defined as R11, and a curvature radius of an image side surface of the sixth lens L6 is defined as R12. The curvature radius R11 and the curvature radius R12 satisfy a following condition: $-1.97 \leq (R11+R12)/(R11-R12) \leq -0.04$, which specifies a shape of the sixth lens L6. Within the range of the above condition, it is beneficial to correct aberration of off-axis angle with the development of ultra-thinness and wide angle. Optionally, the curvature radius R11 and the curvature radius R12 satisfy a following condition: $-1.23 \leq (R11+R12)/(R11-R12) \leq -0.05$.

An on-axis thickness of the sixth lens L6 is defined as d11, and a total optical length from the object side surface of the first lens to an image plane of the camera optical lens 10 along an optic axis is defined as TTL. The on-axis thickness d11 and the total optical length TTL satisfy a following condition: $0.05 \leq d11/TTL \leq 0.19$. Within the range of the above condition, it is beneficial to achieve an ultra-thinness effect. Optionally, the on-axis thickness d11 and the total optical length TTL satisfy a following condition: $0.08 \leq d11/TTL \leq 0.15$.

In this embodiment, the object side surface of the seventh lens L7 is convex in a paraxial region, and the image side surface of the seventh lens L7 is concave in the paraxial region.

A curvature radius of an object side surface of the seventh lens L7 is defined as R13, and a curvature radius of an image side surface of the seventh lens L7 is defined as R14. The curvature radius R13 and the curvature radius R14 satisfy a following condition: $0.73 \leq (R13+R14)/(R13-R14) \leq 7.39$, which specifies a shape of the seventh lens L7. Within the range of the above condition, it is beneficial to correct aberration of off-axis angle with the development of ultra-thinness and wide angle. Optionally, the curvature radius R13 and the curvature radius R14 satisfy a following condition: $1.16 \leq (R13+R14)/(R13-R14) \leq 5.92$.

An on-axis thickness of the seventh lens L7 is defined as d13, and a total optical length from the object side surface of the first lens to an image plane of the camera optical lens 10 along an optic axis is defined as TTL. The on-axis thickness d13 and the total optical length TTL satisfy a following condition: $0.04 \leq d13/TTL \leq 0.12$. Within the range of the above condition, it is beneficial to achieve an ultra-thinness effect. Optionally, the on-axis thickness d13 and the total optical length TTL satisfy a following condition: $0.06 \leq d13/TTL \leq 0.10$.

In this embodiment, an image height of the camera optical lens 10 is IH, and a total optical length from the object side surface of the first lens to an image plane of the camera optical lens 10 along an optic axis is defined as TTL. The image height IH and the total optical length TTL satisfy a following condition: TTL/IH≤1.45. Within the range of the above condition, it is beneficial to achieve an ultra-thinness effect.

In this embodiment, a field of view FOV of the camera optical lens 10 is greater than or equal to 90°, so that a wide-angle effect is achieved.

In this embodiment, an F number FNO of the camera optical lens 10 is less than or equal to 1.91, so that a large aperture is achieved, thereby obtaining a good imaging quality of the camera optical lens.

When the above conditions are satisfied, the camera optical lens 10 may meet the design requirements for large aperture, wide angle and ultra-thinness while maintaining good optical performances. According to properties of the camera optical lens 10, the camera optical lens 10 is especially suitable for mobile phone camera lens components composed of high-pixel CCD, CMOS and other imaging elements and WEB camera lens.

The camera optical lens 10 of the present invention will be described below with examples. The symbols recorded in each example will be described as follows. The focal length, on-axis distance, central curvature radius, on-axis thickness, inflection point position, and arrest point position are each in unit of millimeter (mm).

TTL denotes a total optical length from the object side surface of the first lens to an image plane Si of the camera optical lens 10 along an optic axis, with a unit of millimeter (mm).

F number FNO denotes a ratio of an effective focal length of the camera optical lens to an entrance pupil diameter.

Optionally, the object side surface and/or the image side surface of the lens may be provided with inflection points and/or arrest points in order to meet high-quality imaging requirements. The description below may be referred to in specific embodiments as follows.

Design data of the camera optical lens 10 according to Embodiment 1 of the present invention are shown in Tables 1 and 2.

TABLE 1

|  | R |  | d |  | nd |  | vd |
|---|---|---|---|---|---|---|---|
| S1 | ∞ | d0 = | −1.175 |  |  |  |  |
| R1 | −3.626 | d1 = | 0.331 | nd1 | 1.5444 | v1 | 55.82 |
| R2 | −3.572 | d2 = | 0.030 |  |  |  |  |
| R3 | 2.282 | d3 = | 0.637 | nd2 | 1.5444 | v2 | 55.82 |
| R4 | 4.772 | d4 = | 0.577 |  |  |  |  |
| R5 | −53.996 | d5 = | 0.714 | nd3 | 1.5444 | v3 | 55.82 |
| R6 | −5.046 | d6 = | 0.262 |  |  |  |  |
| R7 | −5.141 | d7 = | 0.594 | nd4 | 1.6700 | v4 | 19.39 |
| R8 | −19.384 | d8 = | 0.356 |  |  |  |  |
| R9 | −4.143 | d9 = | 0.850 | nd5 | 1.5661 | v5 | 37.71 |
| R10 | −45.363 | d10 = | 0.031 |  |  |  |  |
| R11 | 2.501 | d11 = | 0.931 | nd6 | 1.5346 | v6 | 55.69 |
| R12 | −2.817 | d12 = | 0.306 |  |  |  |  |
| R13 | 6.687 | d13 = | 0.550 | nd7 | 1.5346 | v7 | 55.69 |
| R14 | 1.238 | d14 = | 0.600 |  |  |  |  |
| R15 | ∞ | d15 = | 0.210 | ndg | 1.5168 | vg | 64.17 |
| R16 | ∞ | d16 = | 0.521 |  |  |  |  |

The reference signs are explained as follows.
S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of an object side surface of the optical filter GF;
R16: central curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image plane S1;
nd: refractive index of a d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;

nd6: refractive index of the d-line of the sixth lens L6;
nd7: refractive index of the d-line of the seventh lens L7;
ndg: refractive index of the d-line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the sixth lens L6;
v7: Abbe number of the seventh lens L7;
vg: Abbe number of the optical filter GF.

Table 2 shows aspherical surface data of each lens in the camera optical lens 10 according to Embodiment 1 of the present invention.

ment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. P5R1 and P5R2 denote the object side surface and image side surface of the fifth lens L5, respectively. P6R1 and P6R2 denote the object side surface and image side surface of the sixth lens L6, respectively. P7R1 and P7R2 denote the object side surface and image side surface of the seventh lens L7, respectively. Data in an "inflection point position" column are a vertical distance from an

TABLE 2

| | Conic coefficient | Aspherical surface coefficient | | | | |
|---|---|---|---|---|---|---|
| | k | A4 | A6 | A8 | A10 | A12 |
| R1 | 6.6830E−01 | 5.0481E−02 | −2.4109E−02 | 1.7372E−02 | −8.5527E−03 | 2.8672E−03 |
| R2 | 9.2102E−01 | 5.2827E−02 | −2.5731E−02 | 2.5492E−02 | −1.6897E−02 | 7.4833E−03 |
| R3 | 1.9112E−01 | −1.3997E−02 | −3.8474E−03 | 2.5091E−02 | −4.2623E−02 | 4.3957E−02 |
| R4 | 5.4282E−01 | −3.1188E−02 | 1.1484E−02 | 5.9735E−03 | −2.3682E−02 | 2.8012E−02 |
| R5 | −1.5000E+02 | −1.5475E−02 | −1.1305E−02 | 3.1429E−02 | −6.8212E−02 | 9.3841E−02 |
| R6 | −1.0179E+01 | −6.2802E−02 | 2.0805E−03 | 3.2744E−02 | −7.3329E−02 | 9.2274E−02 |
| R7 | −1.5068E+00 | −9.8070E−02 | 1.6704E−02 | −1.8548E−02 | 2.3410E−02 | −5.7632E−03 |
| R8 | −1.5000E+02 | −3.0307E−02 | −1.9153E−03 | 6.5733E−03 | −9.9009E−03 | 9.4036E−03 |
| R9 | −1.8392E−01 | 5.1444E−02 | −1.4446E−02 | −1.3296E−03 | 1.8517E−03 | −1.9978E−04 |
| R10 | 1.5000E+02 | −1.0845E−01 | 6.0485E−02 | −2.8632E−02 | 1.1775E−02 | −3.6480E−03 |
| R11 | −1.1635E+01 | 1.2318E−02 | 2.5856E−05 | −7.9703E−03 | 4.6641E−03 | −1.4000E−03 |
| R12 | −1.3877E+00 | 1.8307E−01 | −9.2514E−02 | 2.6801E−02 | −5.0108E−03 | 5.9364E−04 |
| R13 | −3.2882E−01 | −4.8307E−02 | −7.8065E−03 | 5.2355E−03 | −9.8572E−04 | 1.0128E−04 |
| R14 | −4.3916E+00 | −3.8071E−02 | 7.9332E−03 | −1.1184E−03 | 1.2076E−04 | −9.8867E−06 |

| | Conic coefficient | Aspherical surface coefficient | | | |
|---|---|---|---|---|---|
| | k | A14 | A16 | A18 | A20 |
| R1 | 6.6830E−01 | −6.3200E−04 | 8.7035E−05 | −6.7238E−06 | 2.1950E−07 |
| R2 | 9.2102E−01 | −2.1125E−03 | 3.5987E−04 | −3.2639E−05 | 1.1244E−06 |
| R3 | 1.9112E−01 | −2.8955E−02 | 1.1680E−02 | −2.6068E−03 | 2.4021E−04 |
| R4 | 5.4282E−01 | −1.8738E−02 | 7.3754E−03 | −1.6299E−03 | 1.5606E−04 |
| R5 | −1.5000E+02 | −8.3045E−02 | 4.4359E−02 | −1.3062E−02 | 1.6238E−03 |
| R6 | −1.0179E+01 | −7.1516E−02 | 3.2690E−02 | −8.0660E−03 | 8.2716E−04 |
| R7 | −1.5068E+00 | −1.1497E−02 | 1.0261E−02 | −3.2265E−03 | 3.5467E−04 |
| R8 | −1.5000E+02 | −5.3031E−03 | 1.7254E−03 | −2.9559E−04 | 2.0624E−05 |
| R9 | −1.8392E−01 | −2.7022E−04 | 1.2990E−04 | −2.3011E−05 | 1.4659E−06 |
| R10 | 1.5000E+02 | 7.5876E−04 | −9.6492E−05 | 6.6766E−06 | −1.9082E−07 |
| R11 | −1.1635E+01 | 2.4393E−04 | −2.4885E−05 | 1.3858E−06 | −3.2598E−08 |
| R12 | −1.3877E+00 | −4.1966E−05 | 1.5436E−06 | −1.7320E−08 | −2.8709E−10 |
| R13 | −3.2882E−01 | −6.3455E−06 | 2.4324E−07 | −5.2722E−09 | 4.9716E−11 |
| R14 | −4.3916E+00 | 5.5495E−07 | −1.9327E−08 | 3.7088E−10 | −2.9898E−12 |

Here, k denotes a conic coefficient, and A4, A6, A8, A10, A12, A14, A16, A18, and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (1). However, the present invention is not limited to the aspherical polynomial form shown in the formula (1).

Design data of the inflection point and the arrest point of each lens in the camera optical lens 10 according to Embodiinflexion point provided on a surface of each lens to the optical axis of the camera optical lens 10. Data in an "arrest point position" column are a vertical distance from an arrest point provided on the surface of each lens to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.945 | / | / |
| P1R2 | 2 | 0.865 | 2.015 | / |
| P2R1 | 1 | 1.415 | / | / |
| P2R2 | 1 | 1.055 | / | / |
| P3R1 | 0 | / | / | / |
| P3R2 | 0 | / | / | / |
| P4R1 | 0 | / | / | / |
| P4R2 | 1 | 1.615 | / | / |

TABLE 3-continued

| | Number of inflexion points | Inflexion point position 1 | Inflexion point position 2 | Inflexion point position 3 |
|---|---|---|---|---|
| P5R1 | 1 | 1.855 | / | / |
| P5R2 | 1 | 1.785 | / | / |
| P6R1 | 2 | 1.105 | 2.735 | / |
| P6R2 | 2 | 0.465 | 1.255 | / |
| P7R1 | 3 | 0.495 | 2.025 | 3.855 |
| P7R2 | 1 | 0.815 | / | / |

TABLE 4

| | Number of arrest points | Arrest point position 1 | Arrest point position 2 |
|---|---|---|---|
| P1R1 | 1 | 1.645 | / |
| P1R2 | 1 | 1.475 | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 1.855 | / |
| P6R2 | 2 | 0.995 | 1.505 |
| P7R1 | 2 | 0.845 | 3.445 |
| P7R2 | 1 | 2.605 | / |

Figure 2:
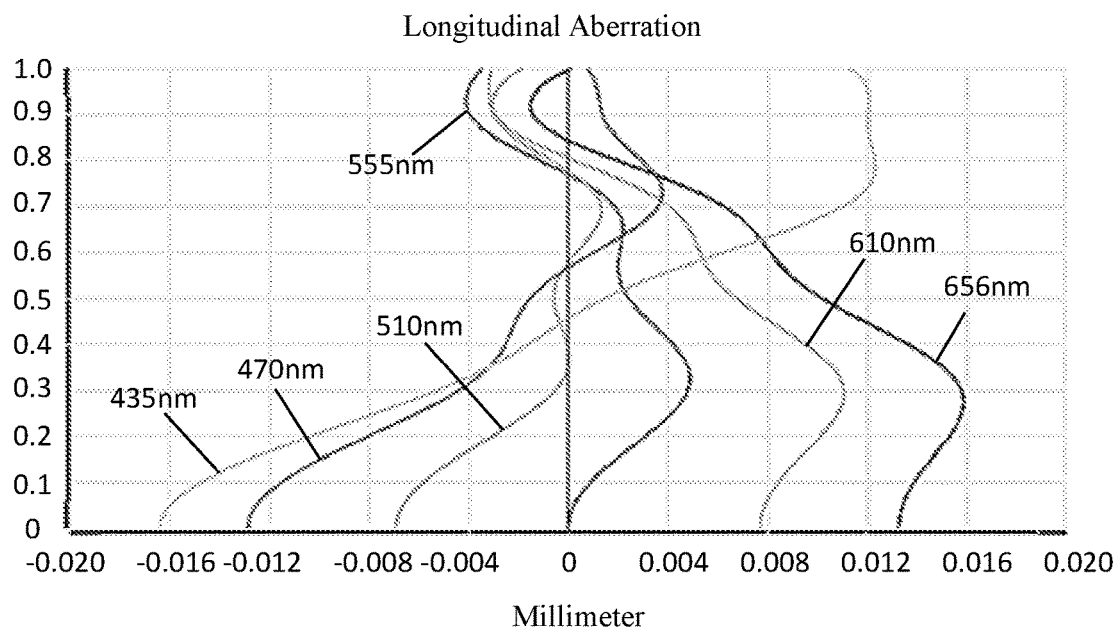
FIG. 2 is a schematic diagram of a longitudinal aberration of the camera optical lens shown in FIG. 1.
Figure 3:
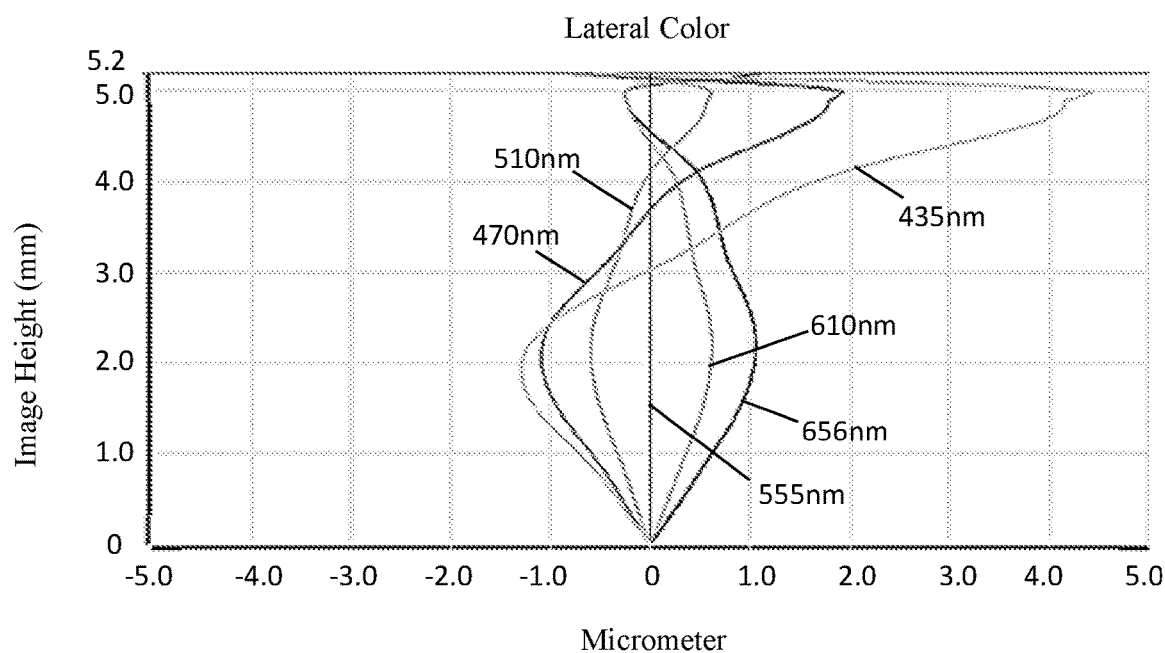
FIG. 3 is a schematic diagram of a lateral color of the camera optical lens shown in FIG. 1.
Figure 4:
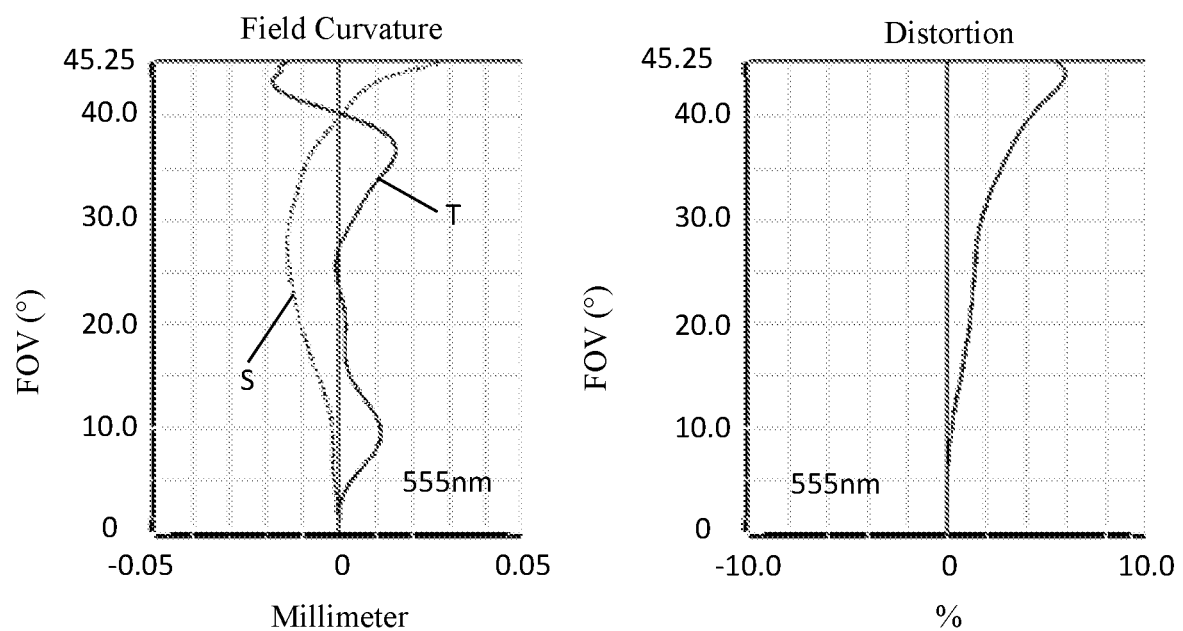
FIG. 4 is a schematic diagram of a field curvature and a distortion of the camera optical lens shown in FIG. 1.
Figure 5:
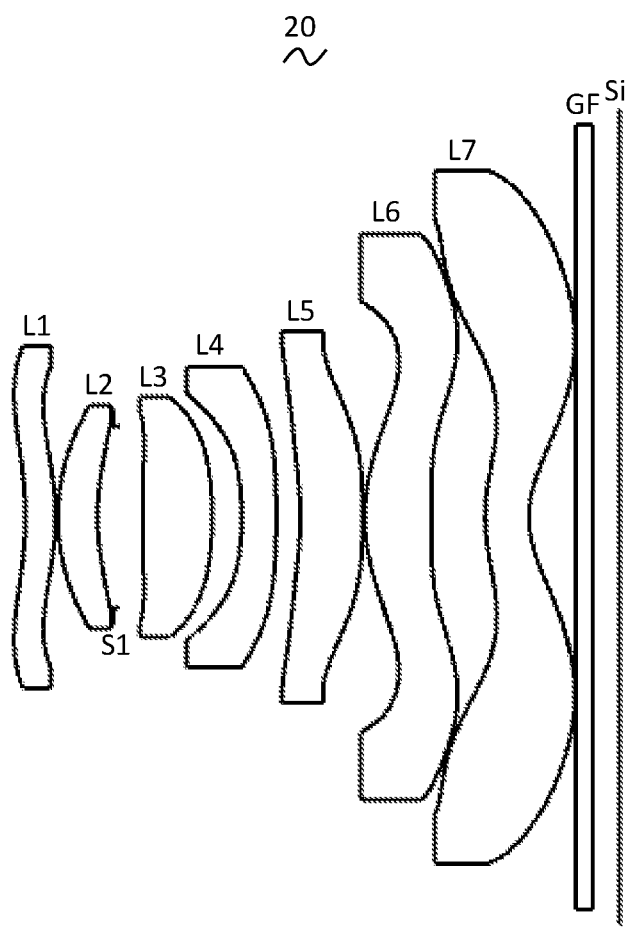
FIG. 5 is a structural schematic diagram of a camera optical lens according to Embodiment 2 of the present invention.

FIG. 2 and FIG. 3 are schematic diagrams of a longitudinal aberration and a lateral color of the camera optical lens 10 after light having a wavelength of 656 nm, 610 nm, 555 nm, 510 nm, 470 nm and 435 nm passes through the camera optical lens 10 according to Embodiment 1, respectively. FIG. 4 is a schematic diagram of a field curvature and a distortion of the camera optical lens 10 after light having a wavelength of 555 nm passes through the camera optical lens 10 according to Embodiment 1. A field curvature S in FIG. 4 is a field curvature in a sagittal direction, and T is a field curvature in a meridian direction.

Table 17 below shows numerical values corresponding to various numerical values in Embodiments 1, 2, 3 and 4 and parameters specified in the conditions.

As shown in Table 17, Embodiment 1 satisfies various conditions.

In this embodiment, an entrance pupil diameter ENPD of the camera optical lens 10 is 2.598 mm, a full-field image height IH is 5.200 mm, and a field of view FOV in a diagonal direction is 90.50°. The camera optical lens 10 satisfies design requirements for large aperture, wide angle and ultra-thinness. The on-axis and off-axis chromatic aberrations are fully corrected, thereby achieving excellent optical performances.

Embodiment 2

Embodiment 2 is basically the same as Embodiment 1, and involves symbols having the same meanings as Embodiment 1, and only differences therebetween are listed below.

In this embodiment, an object side surface of the third lens L3 is convex in a paraxial region.

Design data of the camera optical lens 20 according to Embodiment 2 of the present invention are shown in Tables 5 and 6.

TABLE 5

| | R | | d | | nd | | vd |
|---|---|---|---|---|---|---|---|
| S1 | ∞ | d0 = | −1.116 | | | | |
| R1 | −4.263 | d1 = | 0.380 | nd1 | 1.5444 | v1 | 55.82 |
| R2 | −3.144 | d2 = | 0.030 | | | | |
| R3 | 2.644 | d3 = | 0.500 | nd2 | 1.5444 | v2 | 55.82 |
| R4 | 3.117 | d4 = | 0.568 | | | | |
| R5 | 14.037 | d5 = | 0.877 | nd3 | 1.5444 | v3 | 55.82 |
| R6 | −5.071 | d6 = | 0.373 | | | | |
| R7 | −4.439 | d7 = | 0.439 | nd4 | 1.6700 | v4 | 19.39 |
| R8 | −11.270 | d8 = | 0.300 | | | | |
| R9 | −4.310 | d9 = | 0.784 | nd5 | 1.5661 | v5 | 37.71 |
| R10 | −47.199 | d10 = | 0.030 | | | | |
| R11 | 2.318 | d11 = | 0.848 | nd6 | 1.5346 | v6 | 55.69 |
| R12 | −12.616 | d12 = | 0.672 | | | | |
| R13 | 2.374 | d13 = | 0.550 | nd7 | 1.5346 | v7 | 55.69 |
| R14 | 1.226 | d14 = | 0.600 | | | | |
| R15 | ∞ | d15 = | 0.210 | ndg | 1.5168 | vg | 64.17 |
| R16 | ∞ | d16 = | 0.340 | | | | |

Table 6 shows aspherical surface data of each lens in the camera optical lens 20 according to Embodiment 2 of the present invention.

TABLE 6

| | Conic coefficient | Aspherical surface coefficient | | | | |
|---|---|---|---|---|---|---|
| | k | A4 | A6 | A8 | A10 | A12 |
| R1 | 1.0014E+00 | 3.2915E−02 | −8.4577E−03 | 6.0591E−03 | −2.5281E−03 | 6.6179E−04 |
| R2 | 5.1563E−01 | 6.8144E−02 | −3.1917E−02 | 2.7531E−02 | −1.7567E−02 | 8.2638E−03 |
| R3 | 3.5061E−01 | −1.4235E−02 | 7.7285E−03 | −7.7370E−03 | 9.0387E−03 | −5.9865E−03 |
| R4 | −1.4325E+00 | −6.8033E−02 | 7.7557E−02 | −1.1778E−01 | 1.6559E−01 | −1.6945E−01 |
| R5 | 9.0103E+01 | −1.8878E−02 | −1.6457E−02 | 3.9788E−02 | −7.7187E−02 | 9.2401E−02 |
| R6 | −6.9736E+00 | −4.8092E−02 | −1.6757E−02 | 3.4064E−02 | −4.5280E−02 | 4.1589E−02 |
| R7 | 3.3747E+00 | −7.8310E−02 | 2.2591E−02 | −7.6027E−02 | 1.1110E−01 | −7.6659E−02 |
| R8 | −1.5000E+02 | −3.9693E−02 | 4.2359E−02 | −7.2724E−02 | 6.6453E−02 | −3.5226E−02 |
| R9 | −8.7150E−01 | 2.2355E−02 | 5.3670E−02 | −7.4394E−02 | 4.8367E−02 | −1.9074E−02 |
| R10 | −1.5000E+02 | −1.4175E−01 | 1.0665E−01 | −6.3602E−02 | 2.8458E−02 | −8.9430E−03 |
| R11 | −1.0402E+01 | 2.9673E−02 | −6.9051E−03 | −4.1538E−03 | 2.4299E−03 | −6.2443E−04 |
| R12 | 1.2652E+00 | 1.3778E−01 | −6.3219E−02 | 1.6509E−02 | −2.9157E−03 | 3.5286E−04 |
| R13 | −2.5126E+00 | −7.7614E−02 | 9.7976E−03 | 4.1441E−04 | −3.9243E−04 | 7.7576E−05 |
| R14 | −2.7989E+00 | −5.2625E−02 | 1.3072E−02 | −2.2740E−03 | 2.5138E−04 | −1.6914E−05 |

TABLE 6-continued

| | Conic coefficient | Aspherical surface coefficient | | | |
|---|---|---|---|---|---|
| | k | A14 | A16 | A18 | A20 |
| R1 | 1.0014E+00 | −1.0798E−04 | 1.0333E−05 | −4.9187E−07 | 5.5635E−09 |
| R2 | 5.1563E−01 | −2.7097E−03 | 5.7904E−04 | −7.1720E−05 | 3.8563E−06 |
| R3 | 3.5061E−01 | 1.1536E−03 | 7.7824E−04 | −4.7974E−04 | 7.7291E−05 |
| R4 | −1.4325E+00 | 1.1556E−01 | −4.9556E−02 | 1.2121E−02 | −1.2931E−03 |
| R5 | 9.0103E+01 | −7.0353E−02 | 3.2113E−02 | −8.0159E−03 | 8.2756E−04 |
| R6 | −6.9736E+00 | −2.5473E−02 | 9.4767E−03 | −1.9244E−03 | 1.6197E−04 |
| R7 | 3.3747E+00 | 2.7061E−02 | −4.2429E−03 | 4.6283E−05 | 4.1913E−05 |
| R8 | −1.5000E+02 | 1.1234E−02 | −2.1173E−03 | 2.1638E−04 | −9.1441E−06 |
| R9 | −8.7150E−01 | 4.7475E−03 | −7.2485E−04 | 6.1703E−05 | −2.2319E−06 |
| R10 | −1.5000E+02 | 1.8986E−03 | −2.5539E−04 | 1.9407E−05 | −6.2938E−07 |
| R11 | −1.0402E+01 | 9.2417E−05 | −7.9007E−06 | 3.4623E−07 | −5.4793E−09 |
| R12 | 1.2652E+00 | −2.8633E−05 | 1.4873E−06 | −4.4685E−08 | 5.8949E−10 |
| R13 | −2.5126E+00 | −8.2399E−06 | 5.0105E−07 | −1.6404E−08 | 2.2459E−10 |
| R14 | −2.7989E+00 | 6.5981E−07 | −1.3383E−08 | 1.0419E−10 | −1.5758E−14 |

Design data of the inflection point and the arrest point of each lens in the camera optical lens 20 according to Embodiment 2 of the present invention are shown in Tables 7 and 8.

TABLE 7

| | Number of inflexion points | Inflexion point position 1 | Inflexion point position 2 | Inflexion point position 3 |
|---|---|---|---|---|
| P1R1 | 1 | 0.925 | / | / |
| P1R2 | 1 | 0.825 | / | / |
| P2R1 | 0 | / | / | / |
| P2R2 | 0 | / | / | / |
| P3R1 | 1 | 0.565 | / | / |
| P3R2 | 0 | / | / | / |
| P4R1 | 1 | 1.565 | / | / |
| P4R2 | 1 | 1.785 | / | / |
| P5R1 | 3 | 0.745 | 1.105 | 1.785 |
| P5R2 | 1 | 1.625 | / | / |
| P6R1 | 1 | 1.215 | / | / |
| P6R2 | 2 | 0.235 | 1.455 | / |
| P7R1 | 3 | 0.675 | 2.395 | 3.435 |
| P7R2 | 1 | 0.885 | / | / |

TABLE 8

| | Number of arrest points | Arrest point position 1 | Arrest point position 2 |
|---|---|---|---|
| P1R1 | 1 | 1.575 | / |
| P1R2 | 1 | 1.445 | / |
| P2R1 | 0 | / | / |
| P2R2 | 0 | / | / |
| P3R1 | 1 | 0.915 | / |
| P3R2 | 0 | / | / |
| P4R1 | 0 | / | / |
| P4R2 | 0 | / | / |
| P5R1 | 0 | / | / |
| P5R2 | 1 | 2.275 | / |
| P6R1 | 1 | 1.985 | / |
| P6R2 | 2 | 0.405 | 2.285 |
| P7R1 | 1 | 1.265 | / |
| P7R2 | 1 | 2.275 | / |

Figure 6:
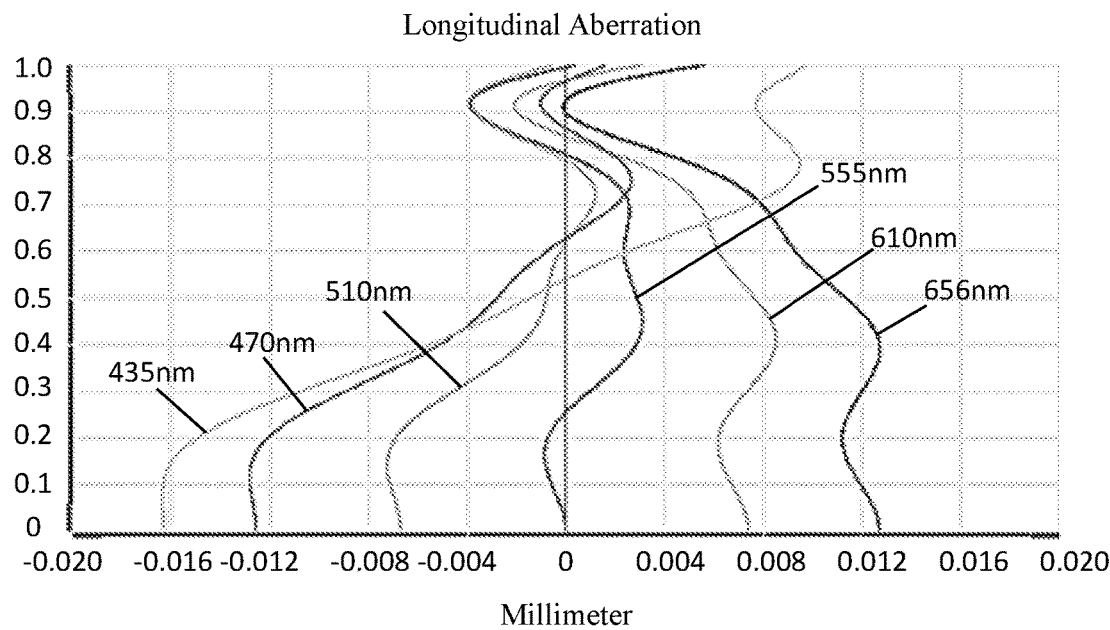
FIG. 6 is a schematic diagram of a longitudinal aberration of the camera optical lens shown in FIG. 5.
Figure 7:
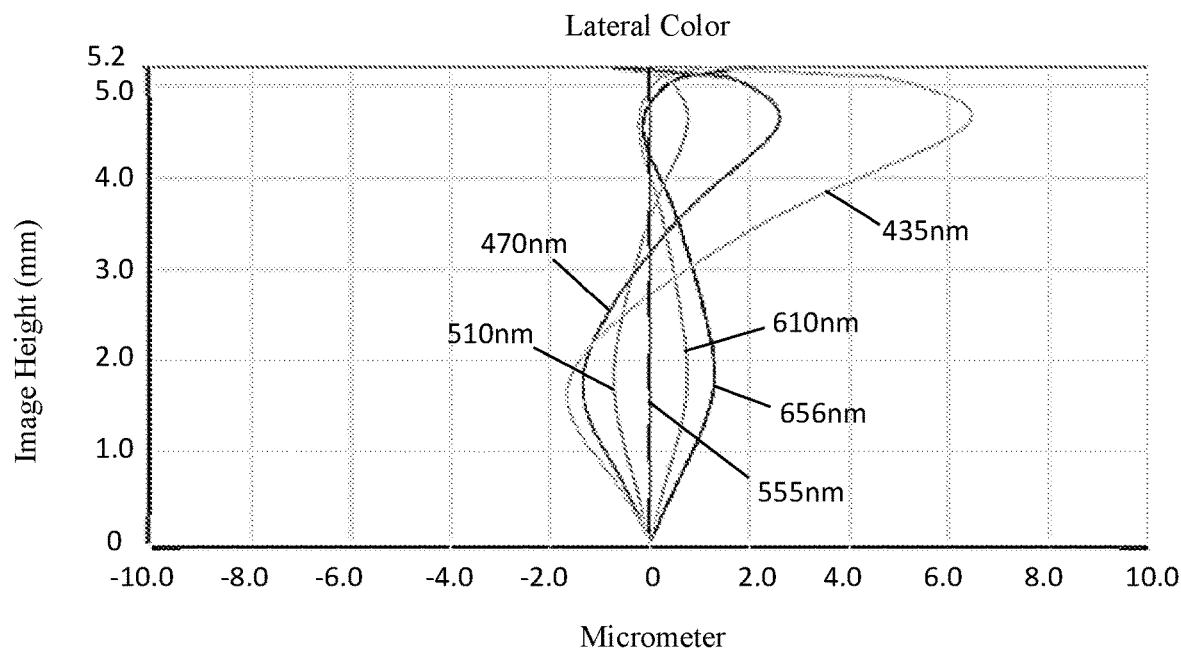
FIG. 7 is a schematic diagram of a lateral color of the camera optical lens shown in FIG. 5.
Figure 8:
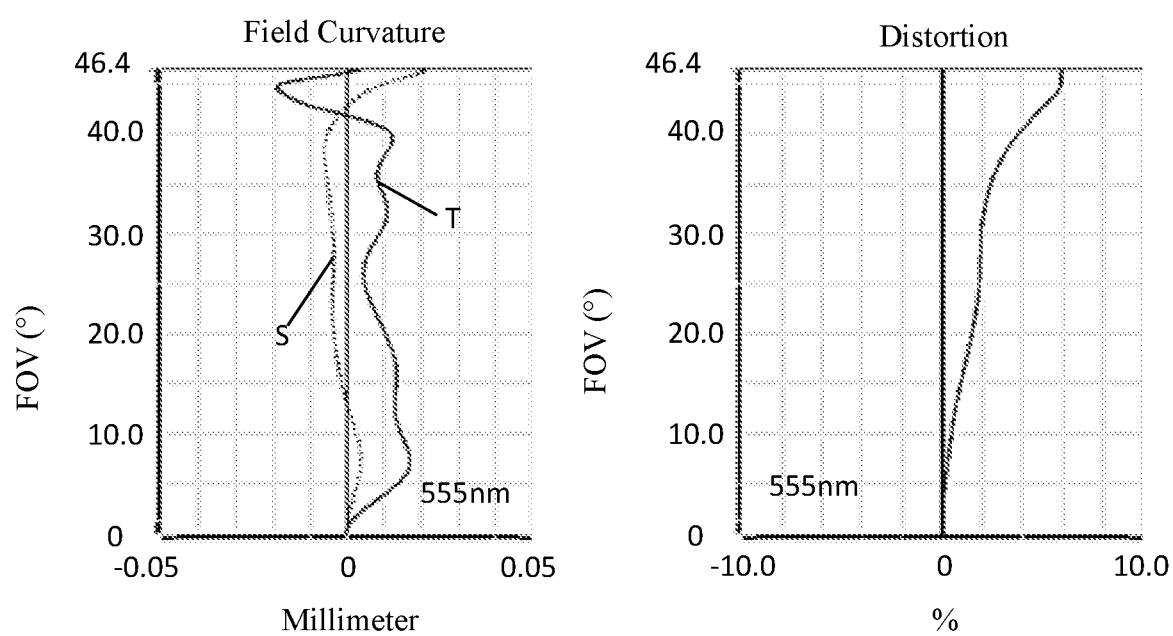
FIG. 8 is a schematic diagram of a field curvature and a distortion of the camera optical lens shown in FIG. 5.
Figure 9:
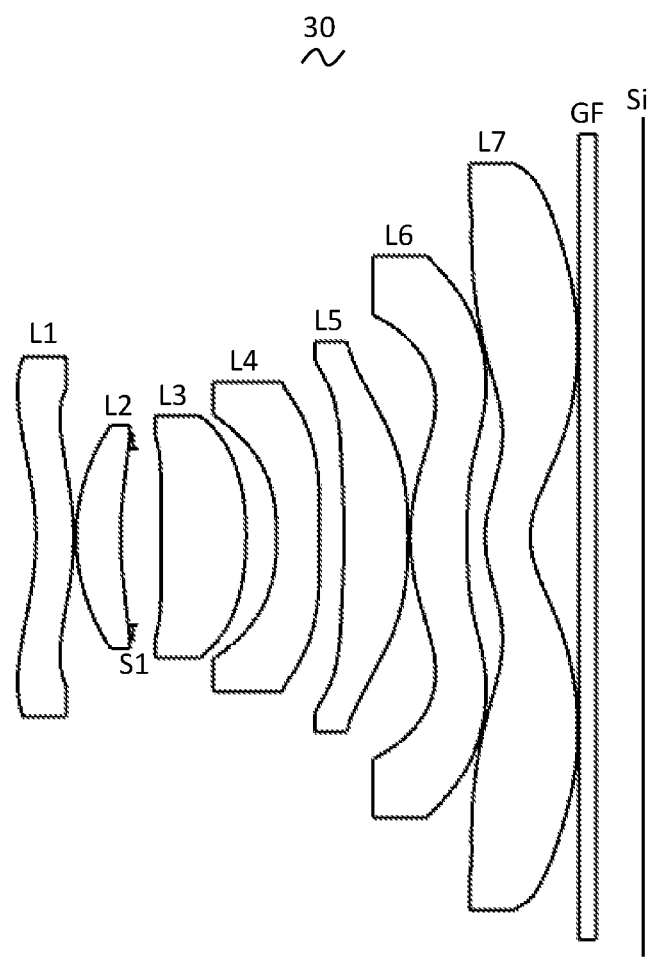
FIG. 9 is a structural schematic diagram of a camera optical lens according to Embodiment 3 of the present invention.

FIG. 6 and FIG. 7 are schematic diagrams of a longitudinal aberration and a lateral color of the camera optical lens 20 after light having a wavelength of 656 nm, 610 nm, 555 nm, 510 nm, 470 nm and 435 nm passes through the camera optical lens 20 according to Embodiment 2, respectively. FIG. 8 is a schematic diagram of a field curvature and a distortion after light having a wavelength of 555 nm passes through the camera optical lens 20 according to Embodiment 2 of the present invention. A field curvature S in FIG. 8 is a field curvature in a sagittal direction, and T is a field curvature in a meridian direction.

As shown in Table 17, Embodiment 2 satisfies various conditions.

In this embodiment, an entrance pupil diameter ENPD of the camera optical lens 20 is 2.523 mm, a full-field image height IH is 5.200 mm, and a field of view FOV in a diagonal direction is 92.80°. The camera optical lens 20 satisfies design requirements for large aperture, wide angle, and ultra-thinness. The on-axis and off-axis chromatic aberrations are fully corrected, thereby achieving excellent optical performances.

Embodiment 3

Embodiment 3 is basically the same as Embodiment 1, and involves symbols having the same meanings as Embodiment 1, and only differences therebetween are listed below.

In this embodiment, an object side surface of a third lens L3 is convex in a paraxial region, and an image side surface of a fourth lens L4 is concave in a paraxial region.

Design data of the camera optical lens 30 of Embodiment 3 of the present invention are shown in Tables 9 and 10.

TABLE 9

| | R | d | | nd | | vd | |
|---|---|---|---|---|---|---|---|
| S1 | ∞ | d0 = | −1.185 | | | | |
| R1 | −3.413 | d1 = | 0.461 | nd1 | 1.5444 | v1 | 55.82 |
| R2 | −3.248 | d2 = | 0.030 | | | | |
| R3 | 2.358 | d3 = | 0.545 | nd2 | 1.5444 | v2 | 55.82 |
| R4 | 4.300 | d4 = | 0.497 | | | | |
| R5 | 110.605 | d5 = | 1.040 | nd3 | 1.5444 | v3 | 55.82 |
| R6 | −3.697 | d6 = | 0.376 | | | | |
| R7 | −3.335 | d7 = | 0.522 | nd4 | 1.6700 | v4 | 19.39 |
| R8 | 58.329 | d8 = | 0.300 | | | | |
| R9 | −10.542 | d9 = | 0.778 | nd5 | 1.5661 | v5 | 37.71 |
| R10 | −13.026 | d10 = | 0.030 | | | | |
| R11 | 2.485 | d11 = | 0.700 | nd6 | 1.5346 | v6 | 55.69 |
| R12 | −304.846 | d12 = | 0.218 | | | | |
| R13 | 1.515 | d13 = | 0.550 | nd7 | 1.5346 | v7 | 55.69 |
| R14 | 1.004 | d14 = | 0.600 | | | | |
| R15 | ∞ | d15 = | 0.210 | ndg | 1.5168 | vg | 64.17 |
| R16 | ∞ | d16 = | 0.572 | | | | |

Table 10 shows aspherical surface data of each lens in the camera optical lens 30 of Embodiment 3 of the present invention.

TABLE 10

| | Conic coefficient | Aspherical surface coefficient | | | | |
|---|---|---|---|---|---|---|
| | k | A4 | A6 | A8 | A10 | A12 |
| R1 | 7.2469E−01 | 4.2523E−02 | −1.5007E−02 | 1.0482E−02 | −5.0880E−03 | 1.7411E−03 |
| R2 | 6.0303E−01 | 5.3263E−02 | −1.8359E−02 | 1.6920E−02 | −1.2451E−02 | 7.1501E−03 |
| R3 | 2.2545E−01 | −2.0052E−02 | 1.7232E−02 | −3.0511E−02 | 5.0709E−02 | −5.8284E−02 |
| R4 | −1.3072E+00 | −5.0594E−02 | 4.3483E−02 | −8.2395E−02 | 1.6745E−01 | −2.4970E−01 |
| R5 | −1.5000E+02 | −1.4990E−02 | −2.8269E−02 | 8.0682E−02 | −1.7301E−01 | 2.3295E−01 |
| R6 | −6.0568E+00 | −5.6178E−02 | −4.8715E−03 | 3.1346E−02 | −5.1062E−02 | 4.7621E−02 |
| R7 | 2.9979E+00 | −1.1722E−01 | 4.0393E−02 | −7.6615E−03 | −3.4413E−03 | 1.4883E−02 |
| R8 | 1.5000E+02 | −9.1512E−02 | 6.8687E−02 | −6.8871E−02 | 5.1060E−02 | −2.4724E−02 |
| R9 | 1.3872E+01 | 2.2796E−03 | 4.8479E−02 | −6.4810E−02 | 4.2378E−02 | −1.7210E−02 |
| R10 | 2.5014E+01 | −1.4970E−01 | 1.1975E−01 | −6.5393E−02 | 2.4522E−02 | −6.2971E−03 |
| R11 | −7.0595E+00 | 1.2394E−02 | 3.7774E−03 | −1.6033E−02 | 8.7034E−03 | −2.5001E−03 |
| R12 | −1.5000E+02 | 1.5466E−01 | −1.0045E−01 | 3.3864E−02 | −7.3595E−03 | 1.0721E−03 |
| R13 | −2.8485E+00 | −1.1050E−01 | 2.0362E−02 | −6.6180E−04 | −2.9794E−04 | 5.3726E−05 |
| R14 | −2.6608E+00 | −8.3760E−02 | 2.5519E−02 | −4.9285E−03 | 6.3671E−04 | −5.5799E−05 |

| | Conic coefficient | Aspherical surface coefficient | | | |
|---|---|---|---|---|---|
| | k | A14 | A16 | A18 | A20 |
| R1 | 7.2469E−01 | −4.0598E−04 | 6.1400E−05 | −5.4009E−06 | 2.0967E−07 |
| R2 | 6.0303E−01 | −2.8842E−03 | 7.5646E−04 | −1.1432E−04 | 7.5693E−06 |
| R3 | 2.2545E−01 | 4.3418E−02 | −2.0050E−02 | 5.1859E−03 | −5.7038E−04 |
| R4 | −1.3072E+00 | 2.4025E−01 | −1.4079E−01 | 4.5628E−02 | −6.2580E−03 |
| R5 | −1.5000E+02 | −2.0113E−01 | 1.0654E−01 | −3.1586E−02 | 3.9947E−03 |
| R6 | −6.0568E+00 | −2.9204E−02 | 1.1254E−02 | −2.4630E−03 | 2.3185E−04 |
| R7 | 2.9979E+00 | −1.7877E−02 | 9.5614E−03 | −2.3767E−03 | 2.3005E−04 |
| R8 | 1.5000E+02 | 7.5438E−03 | −1.4052E−03 | 1.4715E−04 | −6.5809E−06 |
| R9 | 1.3872E+01 | 4.5444E−03 | −7.6805E−04 | 7.5753E−05 | −3.2943E−06 |
| R10 | 2.5014E+01 | 1.1115E−03 | −1.3048E−04 | 9.2091E−06 | −2.9435E−07 |
| R11 | −7.0595E+00 | 4.3328E−04 | −4.5072E−05 | 2.5745E−06 | −6.1733E−08 |
| R12 | −1.5000E+02 | −1.0367E−04 | 6.3553E−06 | −2.2283E−07 | 3.3969E−09 |
| R13 | −2.8485E+00 | −4.4047E−06 | 1.9995E−07 | −4.8561E−09 | 4.9282E−11 |
| R14 | −2.6608E+00 | 3.2691E−06 | −1.2218E−07 | 2.6259E−09 | −2.4644E−11 |

Design data of the inflection point and the arrest point of each lens in the camera optical lens 30 according to Embodiment 3 of the present invention are shown in Tables 11 and 12.

TABLE 11

| | Number of inflexion points | Inflexion point position 1 | Inflexion point position 2 | Inflexion point position 3 |
|---|---|---|---|---|
| P1R1 | 1 | 1.035 | / | / |
| P1R2 | 1 | 0.875 | / | / |
| P2R1 | 0 | / | / | / |
| P2R2 | 1 | 0.865 | / | / |
| P3R1 | 1 | 0.215 | / | / |
| P3R2 | 0 | / | / | / |
| P4R1 | 0 | / | / | / |
| P4R2 | 2 | 0.135 | 1.755 | / |
| P5R1 | 3 | 0.755 | 0.775 | 2.045 |
| P5R2 | 2 | 1.795 | 2.425 | / |
| P6R1 | 1 | 1.035 | / | / |
| P6R2 | 3 | 0.045 | 1.175 | 3.405 |
| P7R1 | 3 | 0.635 | 2.025 | 3.825 |
| P7R2 | 1 | 0.755 | / | / |

TABLE 12

| | Number of arrest points | Arrest point position 1 | Arrest point position 2 | Arrest point position 3 |
|---|---|---|---|---|
| P1R1 | 1 | 1.815 | / | / |
| P1R2 | 1 | 1.485 | / | / |
| P2R1 | 0 | / | / | / |
| P2R2 | 0 | / | / | / |
| P3R1 | 1 | 0.355 | / | / |
| P3R2 | 0 | / | / | / |
| P4R1 | 0 | / | / | / |
| P4R2 | 1 | 0.225 | / | / |
| P5R1 | 0 | / | / | / |
| P5R2 | 0 | / | / | / |
| P6R1 | 1 | 1.685 | / | / |
| P6R2 | 2 | 0.075 | 1.905 | / |
| P7R1 | 3 | 1.275 | 3.705 | 3.905 |
| P7R2 | 1 | 2.405 | / | / |

Figure 10:
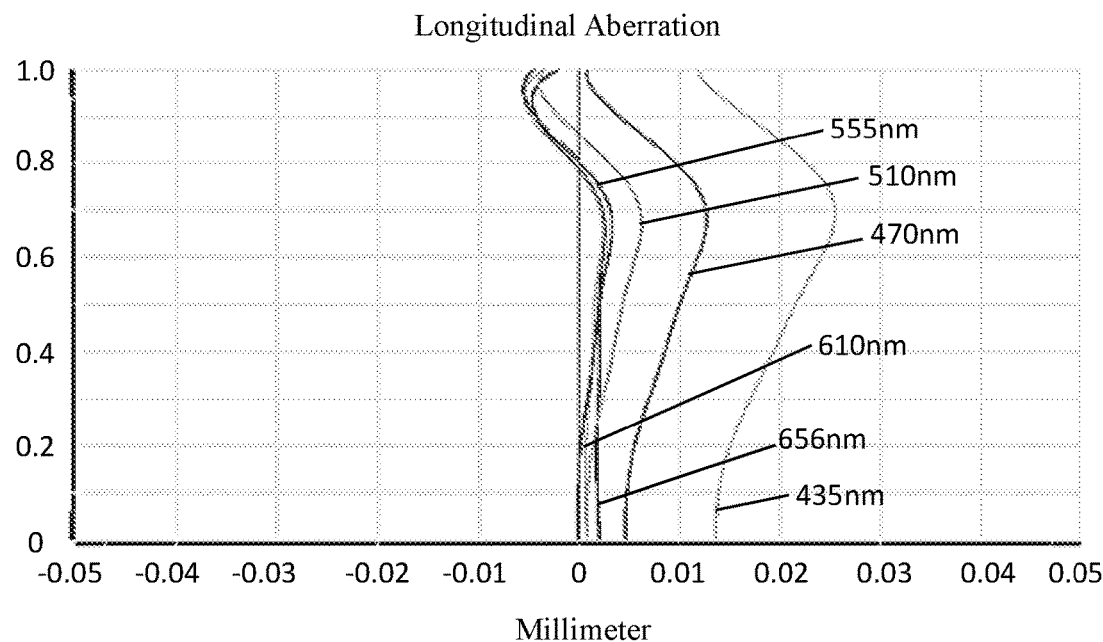
FIG. 10 is a schematic diagram of a longitudinal aberration of the camera optical lens shown in FIG. 9.
Figure 11:
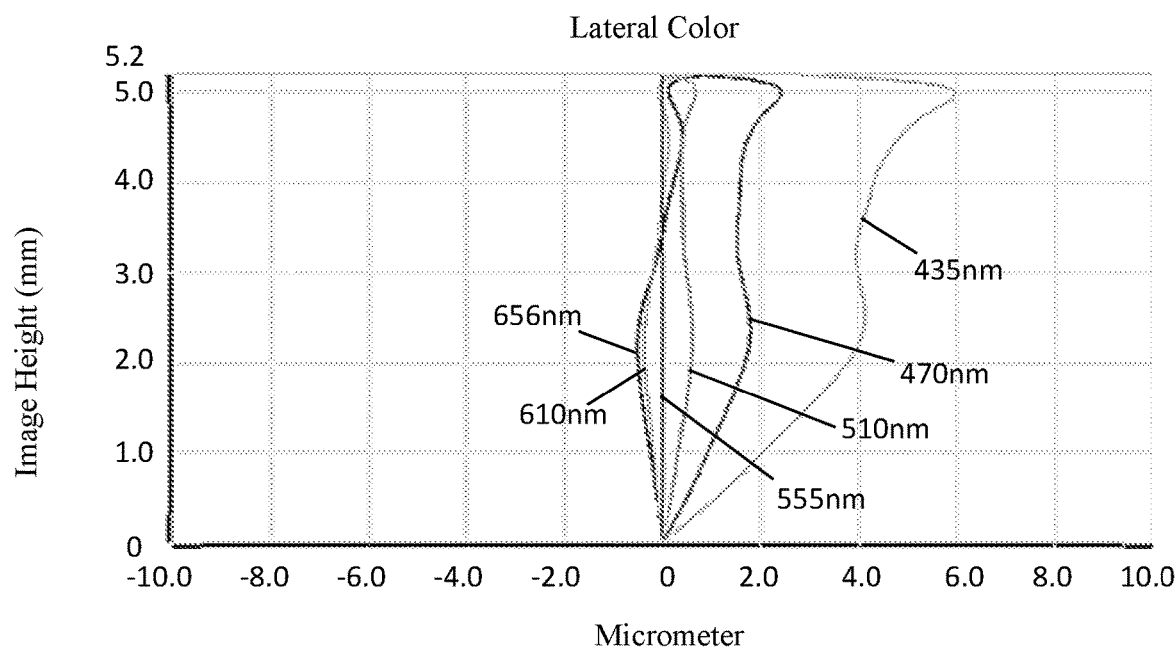
FIG. 11 is a schematic diagram of a lateral color of the camera optical lens shown in FIG. 9.
Figure 12:
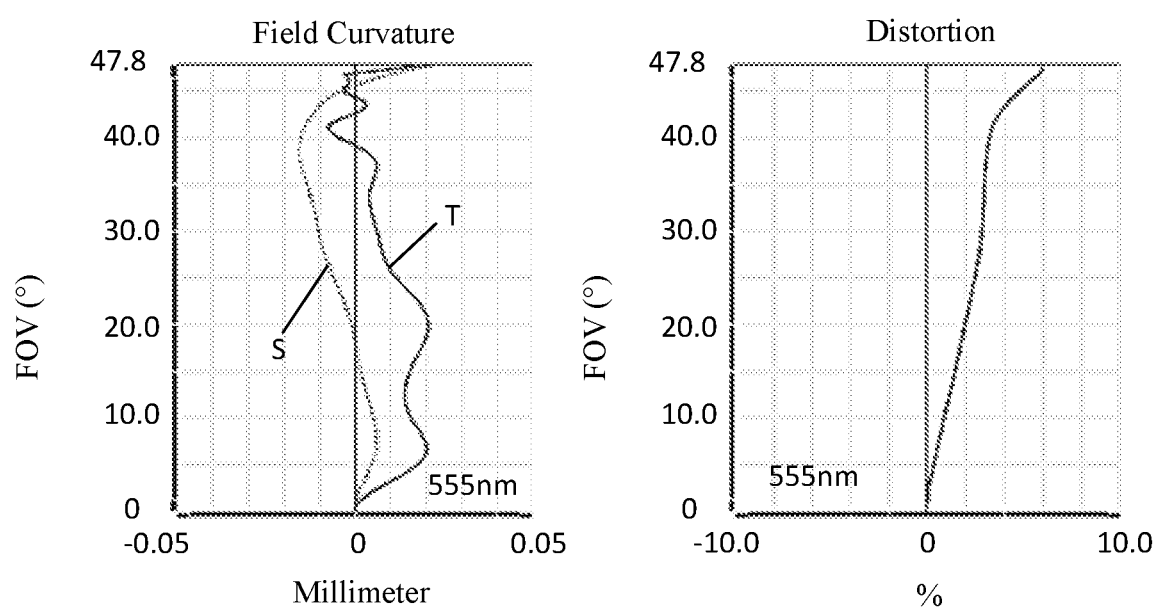
FIG. 12 is a schematic diagram of a field curvature and a distortion of the camera optical lens shown in FIG. 9.
Figure 13:
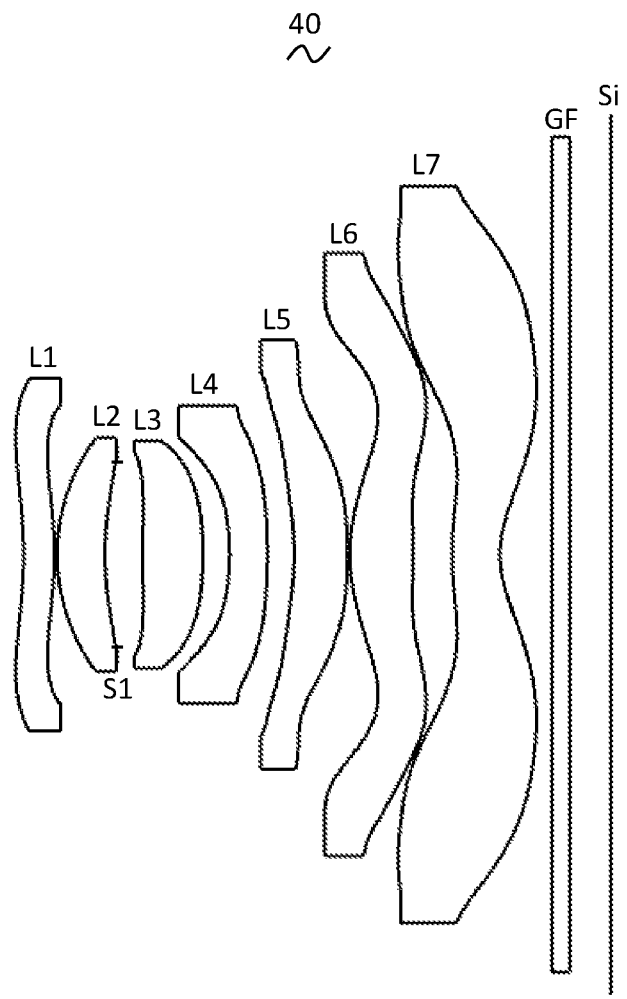
FIG. 13 is a structural schematic diagram of a camera optical lens according to Embodiment 4 of the present invention.

FIG. 10 and FIG. 11 are schematic diagrams of a longitudinal aberration and a lateral color after light having a wavelength of 656 nm, 610 nm, 555 nm, 510 nm, 470 nm and 435 nm passes through the camera optical lens 30 according to Embodiment 3. FIG. 12 is a schematic diagram of a field curvature and a distortion of the camera optical lens 30 after light having a wavelength of 555 nm passes through the camera optical lens 30 according to Embodiment 3.

Table 17 below shows numerical values corresponding to each condition in this embodiment according to the above conditions. It is appreciated that, the cameral optical lens 30 in this embodiment satisfies the above conditions.

In this embodiment, an entrance pupil diameter ENPD of the camera optical lens 30 is 2.344 mm, a full-field image height IH is 5.200 mm, and a field of view FOV in a diagonal direction is 95.60°. The camera optical lens 30 satisfies design requirements for large aperture, wide angle and ultra-thinness. The on-axis and off-axis chromatic aberrations are fully corrected, thereby achieving excellent optical performances.

Embodiment 4

Embodiment 4 is basically the same as Embodiment 1, and involves symbols having the same meanings as Embodiment 1, and only differences therebetween are listed below.

In this embodiment, an object side surface of a third lens L3 is convex in a paraxial region.

Design data of the camera optical lens 40 of Embodiment 4 of the present invention are shown in Tables 13 and 14.

TABLE 13

|     | R       | d     |       | nd     |    | vd    |
|-----|---------|-------|-------|--------|-----|-------|
| S1  | ∞       | d0 =  | −1.084 |        |     |       |
| R1  | −5.046  | d1 =  | 0.357 | nd1 1.5444 | v1 | 55.82 |
| R2  | −4.092  | d2 =  | 0.030 |        |     |       |
| R3  | 2.381   | d3 =  | 0.553 | nd2 1.5444 | v2 | 55.82 |
| R4  | 3.551   | d4 =  | 0.436 |        |     |       |
| R5  | 24.488  | d5 =  | 0.699 | nd3 1.5444 | v3 | 55.82 |
| R6  | −4.358  | d6 =  | 0.306 |        |     |       |
| R7  | −3.571  | d7 =  | 0.436 | nd4 1.6700 | v4 | 19.39 |
| R8  | −8.562  | d8 =  | 0.314 |        |     |       |
| R9  | −3.337  | d9 =  | 0.610 | nd5 1.5661 | v5 | 37.71 |
| R10 | −13.564 | d10 = | 0.034 |        |     |       |
| R11 | 2.115   | d11 = | 0.733 | nd6 1.5346 | v6 | 55.69 |
| R12 | −5.409  | d12 = | 0.446 |        |     |       |
| R13 | 3.447   | d13 = | 0.554 | nd7 1.5346 | v7 | 55.69 |
| R14 | 1.207   | d14 = | 0.600 |        |     |       |
| R15 | ∞       | d15 = | 0.210 | ndg 1.5168 | vg | 64.17 |
| R16 | ∞       | d16 = | 0.473 |        |     |       |

Table 14 shows aspherical surface data of each lens in the camera optical lens 40 of Embodiment 4 of the present invention.

Design data of the inflection point and the arrest point of each lens in the camera optical lens 40 according to Embodiment 4 of the present invention are shown in Tables 15 and 16.

TABLE 15

|       | Number of inflexion points | Inflexion point position 1 | Inflexion point position 2 | Inflexion point position 3 | Inflexion point position 4 |
|-------|-----|-------|-------|-------|-------|
| P1R1  | 1   | 0.795 | /     | /     | /     |
| P1R2  | 1   | 0.705 | /     | /     | /     |
| P2R1  | 0   | /     | /     | /     | /     |
| P2R2  | 2   | 0.955 | 1.135 | /     | /     |
| P3R1  | 2   | 0.335 | 1.205 | /     | /     |
| P3R2  | 0   | /     | /     | /     | /     |
| P4R1  | 0   | /     | /     | /     | /     |
| P4R2  | 1   | 1.485 | /     | /     | /     |
| P5R1  | 2   | 1.715 | 1.965 | /     | /     |
| P5R2  | 2   | 1.505 | 2.235 | /     | /     |
| P6R1  | 3   | 1.035 | 2.425 | 3.175 | /     |
| P6R2  | 4   | 0.285 | 1.225 | 3.145 | 3.505 |
| P7R1  | 3   | 0.515 | 2.035 | 3.975 | /     |
| P7R2  | 3   | 0.755 | 3.975 | 4.325 | /     |

TABLE 16

|       | Number of arrest points | Arrest point position 1 | Arrest point position 2 |
|-------|-----|-------|-----|
| P1R1  | 1   | 1.395 | /   |
| P1R2  | 1   | 1.215 | /   |
| P2R1  | 0   | /     | /   |

TABLE 14

| | Conic coefficient | Aspherical surface coefficient | | | | |
|---|---|---|---|---|---|---|
| | k | A4 | A6 | A8 | A10 | A12 |
| R1 | 6.7954E−01 | 3.6307E−02 | −1.1462E−02 | 9.5262E−03 | −6.2560E−03 | 2.9411E−03 |
| R2 | 5.4900E−01 | 8.0385E−02 | −8.0271E−02 | 1.0738E−01 | −9.8690E−02 | 6.1158E−02 |
| R3 | 4.9046E−01 | 3.0803E−02 | −1.3338E−01 | 2.5838E−01 | −2.9558E−01 | 1.9219E−01 |
| R4 | 4.9228E−01 | −6.4005E−02 | 1.2141E−01 | −3.6511E−01 | 7.6927E−01 | −1.0771E+00 |
| R5 | −1.1012E+02 | −1.5042E−02 | −1.2487E−01 | 5.7044E−01 | −1.6544E+00 | 2.9178E+00 |
| R6 | 8.0920E−01 | −4.4279E−02 | −1.2031E−01 | 4.0385E−01 | −8.6272E−01 | 1.1593E+00 |
| R7 | 1.2534E+00 | −1.2552E−01 | 1.3645E−01 | −4.7399E−01 | 9.1129E−01 | −1.0154E+00 |
| R8 | −1.6017E+00 | −2.8453E−02 | 2.2964E−02 | −8.1178E−02 | 1.0232E−01 | −6.6398E−02 |
| R9 | −3.0176E−01 | 6.2200E−02 | 3.3285E−02 | −8.4552E−02 | 6.0488E−02 | −2.1838E−02 |
| R10 | 2.4102E+01 | −1.8506E−01 | 1.6184E−01 | −9.7912E−02 | 3.9290E−02 | −1.0165E−02 |
| R11 | −1.2962E+01 | 4.2045E−02 | −1.5935E−02 | −5.6736E−03 | 4.3465E−03 | −1.2448E−03 |
| R12 | 3.4829E−01 | 2.1564E−01 | −1.2395E−01 | 4.0492E−02 | −8.9274E−03 | 1.3275E−03 |
| R13 | −2.1695E+00 | −1.0271E−01 | 2.2147E−02 | −3.5976E−03 | 6.0203E−04 | −7.9771E−05 |
| R14 | −3.8165E+00 | −6.3857E−02 | 2.0940E−02 | −5.3703E−03 | 9.6887E−04 | −1.1409E−04 |

| | Conic coefficient | Aspherical surface coefficient | | | |
|---|---|---|---|---|---|
| | k | A14 | A16 | A18 | A20 |
| R1 | 6.7954E−01 | −9.0514E−04 | 1.7274E−04 | −1.8593E−05 | 8.6096E−07 |
| R2 | 5.4900E−01 | −2.4880E−02 | 6.3932E−03 | −9.4187E−04 | 6.0633E−05 |
| R3 | 4.9046E−01 | −5.9207E−02 | −4.4725E−04 | 4.9265E−03 | −8.6759E−04 |
| R4 | 4.9228E−01 | 9.8338E−01 | −5.6247E−01 | 1.8278E−01 | −2.5683E−02 |
| R5 | −1.1012E+02 | −3.1947E+00 | 2.1143E+00 | −7.7552E−01 | 1.2102E−01 |
| R6 | 8.0920E−01 | −9.7420E−01 | 4.9420E−01 | −1.3852E−01 | 1.6478E−02 |
| R7 | 1.2534E+00 | 7.1364E−01 | −3.1847E−01 | 8.3118E−02 | −9.6247E−03 |
| R8 | −1.6017E+00 | 2.5136E−02 | −5.8060E−03 | 8.0732E−04 | −5.3965E−05 |
| R9 | −3.0176E−01 | 3.8771E−03 | −1.7252E−03 | −3.8753E−05 | 4.0886E−06 |
| R10 | 2.4102E+01 | 1.7323E−03 | −1.9288E−04 | 1.2846E−05 | −3.8651E−07 |
| R11 | −1.2962E+01 | 1.9935E−04 | −1.8334E−05 | 9.0046E−07 | −1.8300E−08 |
| R12 | 3.4829E−01 | −1.2821E−04 | 7.6102E−06 | −2.5040E−07 | 3.4779E−09 |
| R13 | −2.1695E+00 | 6.7820E−06 | −3.4283E−07 | 9.4254E−09 | −1.0893E−10 |
| R14 | −3.8165E+00 | 8.4728E−06 | −3.8168E−07 | 9.5201E−09 | −1.0085E−10 |

TABLE 16-continued

| | Number of arrest points | Arrest point position 1 | Arrest point position 2 |
|---|---|---|---|
| P2R2 | 0 | / | / |
| P3R1 | 1 | 0.565 | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 2 | 1.665 | 3.135 |
| P6R2 | 2 | 0.525 | 1.755 |
| P7R1 | 2 | 0.945 | 3.625 |
| P7R2 | 1 | 1.965 | / |

Figure 14:
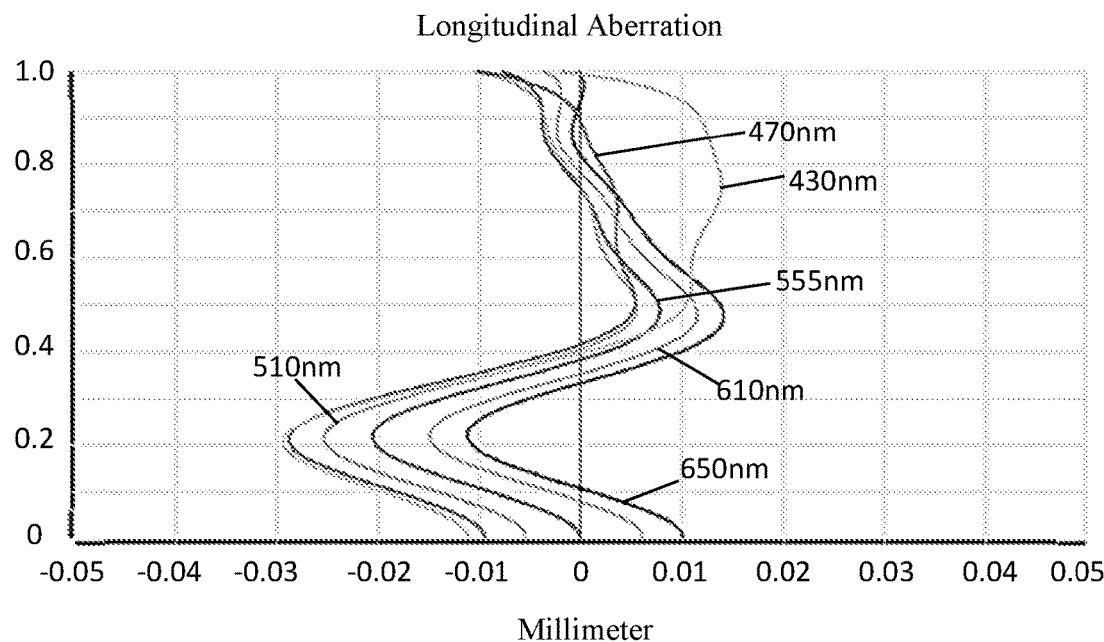
FIG. 14 is a schematic diagram of a longitudinal aberration of the camera optical lens shown in FIG. 13.
Figure 15:
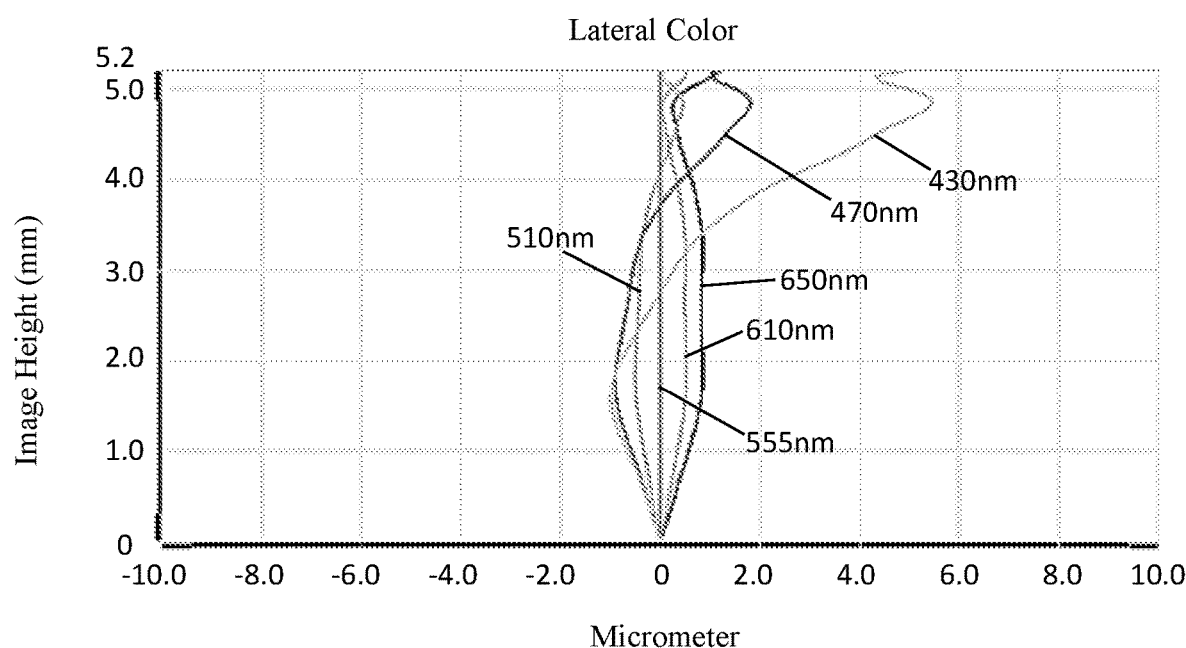
FIG. 15 is a schematic diagram of a lateral color of the camera optical lens shown in FIG. 13.
Figure 16:
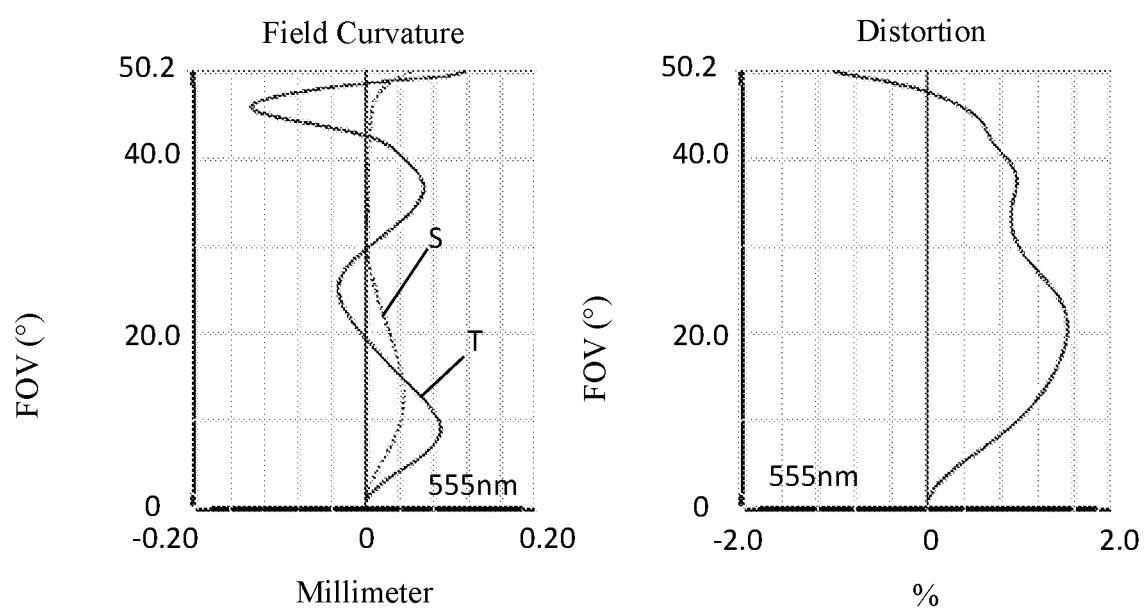
FIG. 16 is a schematic diagram of a field curvature and a distortion of the camera optical lens shown in FIG. 13.

FIG. 14 and FIG. 15 are schematic diagrams of a longitudinal aberration and a lateral color after light having a wavelength of 656 nm, 610 nm, 555 nm, 510 nm, 470 nm and 430 nm passes through the camera optical lens 40 according to Embodiment 4. FIG. 16 is a schematic diagram of a field curvature and a distortion of the camera optical lens 30 after light having a wavelength of 555 nm passes through the camera optical lens 40 according to Embodiment 4.

Table 17 below shows numerical values corresponding to each condition in this embodiment according to the above conditions. It is appreciated that, the camera optical lens 40 in this embodiment satisfies the above conditions.

In this embodiment, an entrance pupil diameter ENPD of the camera optical lens 40 is 2.403 mm, a full-field image height IH is 5.200 mm, and a field of view FOV in a diagonal direction is 100.40°. The camera optical lens 40 satisfies design requirements for large aperture, wide angle and ultra-thinness. Its on-axis and off-axis chromatic aberrations are fully corrected, thereby achieving excellent optical performances.

TABLE 17

| Parameters and conditions | Embodiment 1 | Embodiment 2 | Embodiment 3 | Embodiment 4 |
|---|---|---|---|---|
| f2/f | 1.50 | 4.98 | 1.95 | 2.59 |
| (R9 + R10)/(R9 − R10) | −1.20 | −1.20 | −9.49 | −1.65 |
| f7/f | −0.60 | −1.22 | −2.00 | −0.87 |
| f | 4.884 | 4.668 | 4.454 | 4.383 |
| f1 | 138.726 | 19.570 | 61.861 | 34.990 |
| f2 | 7.341 | 23.248 | 8.700 | 11.342 |
| f3 | 10.140 | 6.933 | 6.571 | 6.832 |
| f4 | −10.525 | −11.117 | −4.649 | −9.392 |
| f5 | −8.075 | −8.395 | −109.659 | −7.954 |
| f6 | 2.631 | 3.725 | 4.599 | 2.935 |
| f7 | −2.936 | −5.675 | −8.904 | −3.791 |
| FNO | 1.88 | 1.85 | 1.90 | 1.82 |
| TTL | 7.500 | 7.501 | 7.429 | 6.791 |
| IH | 5.200 | 5.200 | 5.200 | 5.200 |
| FOV | 90.50° | 92.80° | 95.60° | 100.40° |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:
a first lens having positive refractive power;
a second lens having positive refractive power;
a third lens having positive refractive power;
a fourth lens having negative refractive power;
a fifth lens having negative refractive power;
a sixth lens having positive refractive power; and
a seventh lens having negative refractive power,
wherein the camera optical lens satisfies following conditions:

$$0.27 \leq f6/f \leq 1.55;$$

$$-1.97 \leq (R11+R12)/(R11-R12) \leq -0.04; \text{ and}$$

$$0.05 \leq d11/TTL \leq 0.19,$$

$$1.50 \leq f2/f \leq 5.00;$$

$$-9.50 \leq (R9+R10)/(R9-R10) \leq -1.20; \text{ and}$$

$$-2.00 \leq f7/f \leq -0.60,$$

where
f denotes a focal length of the camera optical lens;
f6 denotes a focal length of the sixth lens;
R11 denotes a central curvature radius of an object side surface of the sixth lens;
R12 denotes a central curvature radius of an image side surface of the sixth lens;
d11 denotes an on-axis thickness of the sixth lens;
TTL denotes a total optical length from an object side surface of the first lens to an image plane of the camera optical lens along an optic axis;
f2 denotes a focal length of the second lens;
f7 denotes a focal length of the seventh lens;
R9 denotes a central curvature radius of an object side surface of the fifth lens; and
R10 denotes a central curvature radius of an image side surface of the fifth lens.

2. The camera optical lens as described in claim 1, wherein the camera optical lens further satisfies a following condition:

$$1.20 \leq d5/d7 \leq 2.00,$$

where
d5 denotes an on-axis thickness of the third lens; and
d7 denotes an on-axis thickness of the fourth lens.

3. The camera optical lens as described in claim 1, wherein the camera optical lens further satisfies following conditions:

$$2.10 \leq f1/f \leq 42.61;$$

$$3.31 \leq (R1+R2)/(R1-R2) \leq 199.94; \text{ and}$$

$$0.02 \leq d1/TTL \leq 0.09,$$

where
f1 denotes a focal length of the first lens;
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, wherein the camera optical lens further satisfies following conditions:

$$-24.36 \leq (R3+R4)/(R3-R4) \leq -1.89; \text{ and}$$

$$0.03 \leq d3/TTL \leq 0.13,$$

where

R3 denotes a central curvature radius of an object side surface of the second lens;

R4 denotes a central curvature radius of an image side surface of the second lens;

d3 denotes an on-axis thickness of the second lens; and

TTL denotes a total optical length from an object side surface of the first lens to an image plane of the camera optical lens along an optic axis.

5. The camera optical lens as described in claim 1, wherein the camera optical lens further satisfies following conditions:

$0.74 \leq f3/f \leq 3.11$;

$0.23 \leq (R5+R6)/(R5-R6) \leq 1.81$; and $0.05 \leq d5/TTL \leq 0.21$, where f3 denotes a focal length of the third lens;

R5 denotes a central curvature radius of an object side surface of the third lens;

R6 denotes a central curvature radius of an image side surface of the third lens;

d5 denotes an on-axis thickness of the third lens; and

TTL denotes a total optical length from an object side surface of the first lens to an image plane of the camera optical lens along an optic axis.

6. The camera optical lens as described in claim 1, wherein the camera optical lens further satisfies following conditions:

$-4.76 \leq f4/f \leq -0.70$;

$-4.86 \leq (R7+R8)/(R7-R8) \leq -0.59$; and $0.03 \leq d7/TTL \leq 0.12$, where f4 denotes a focal length of the fourth lens;

R7 denotes a central curvature radius of an object side surface of the fourth lens;

R8 denotes a central curvature radius of an image side surface of the fourth lens;

d7 denotes an on-axis thickness of the fourth lens; and

TTL denotes a total optical length from an object side surface of the first lens to an image plane of the camera optical lens along an optic axis.

7. The camera optical lens as described in claim 1, wherein the camera optical lens further satisfies following conditions:

$-49.24 \leq f5/f \leq -1.10$; and $0.04 \leq d9/TTL \leq 0.17$, where f5 denotes a focal length of the fifth lens;

d9 denotes an on-axis thickness of the fifth lens; and

TTL denotes a total optical length from an object side surface of the first lens to an image plane of the camera optical lens along an optic axis.

8. The camera optical lens as described in claim 1, wherein the camera optical lens further satisfies following conditions:

$0.73 \leq (R13+R14)/(R13-R14) \leq 7.39$; and $0.04 \leq d13/TTL \leq 0.12$, where R13 denotes a central curvature radius of an object side surface of the seventh lens;

R14 denotes a central curvature radius of an image side surface of the seventh lens;

d13 denotes an on-axis thickness of the seventh lens; and

TTL denotes a total optical length from an object side surface of the first lens to an image plane of the camera optical lens along an optic axis.

9. The camera optical lens as described in claim 1, wherein the camera optical lens further satisfies a following condition:

$TTL/IH \leq 1.45$, where

IH denotes an image height of the camera optical lens; and

TTL denotes a total optical length from an object side surface of the first lens to an image plane of the camera optical lens along an optic axis.

* * * * *